United States Patent [19]

Andersson

[11] Patent Number: 4,484,977

[45] Date of Patent: Nov. 27, 1984

[54] ARRANGEMENT FOR THE PROCESSING OF A PACKING CONTAINER

[75] Inventor: Roland J. E. Andersson, Malmö, Sweden

[73] Assignee: Tetra Pak International AB, Lund, Sweden

[21] Appl. No.: 503,090

[22] Filed: Jun. 10, 1983

[30] Foreign Application Priority Data

Jun. 21, 1982 [SE] Sweden ............................... 8203839

[51] Int. Cl.³ .............................................. B30B 15/34
[52] U.S. Cl. .................................... 156/583.1; 53/373; 100/264; 100/270; 156/580; 493/184; 493/206
[58] Field of Search ..................... 156/583.1, 515, 580; 53/373, 375; 493/184, 206; 100/264, 270, 234

[56] References Cited

U.S. PATENT DOCUMENTS 3,956,871 5/1976 Johnson ................................. 53/373
3,986,921 10/1976 Putnam, Jr. et al. ............ 156/583.1
4,040,237 8/1977 O'Brien ................................ 100/264
4,078,364 3/1978 Schmidt .............................. 493/184

Primary Examiner—Michael Wityshyn
Attorney, Agent, or Firm—Burns, Doane, Swecker & Mathis

[57] ABSTRACT

In the manufacture of packing containers of the non-returnable type for, e.g., milk, the forming and closing of the ridgelike top of the filled packing container represents the final phase in the manufacture. The top is provided with sealing panels which are intended jointly to form a top fin on the closed packing container. The present invention relates to an arrangement for the processing of a packing container by compressing and sealing the top fin of the container. The arrangement includes two processing jaws which are movably suspended in spring elements and are movable symmetrically between an active position wherein the jaws contact the sealing fin and an inactive position wherein the jaws are spaced from the sealing fin.

10 Claims, 2 Drawing Figures

ARRANGEMENT FOR THE PROCESSING OF A PACKING CONTAINER

BACKGROUND AND SUMMARY OF THE INVENTION

The present invention relates to an arrangement for the processing of a sealing fin on a packing container. More specifically, the present invention relates to an arrangement for the processing of a sealing fin of a packing container, the arrangement having two co-operating processing jaws, carrier elements for the jaws and driving elements.

In packing machines of the type which produce and fill so-called ridge or gable-top packages from pre-formed laminated blanks, a sealing together and shaping of the ridgelike upper part of the packing container takes place after the filling. In the sealing together of the sealing panels of the top, the thermoplastic surface layers of the packing laminate are made use of as an adhesive. The packing containers therefore pass through activating and preforming stations wherein the sealing panels are heated so that the thermoplastic layers melt and the packing top is mechanically preformed to practically the final ridge shape. Then a compression and sealing of the upper sealing panels which are to form the sealing fin of the top is achieved by co-operating processing jaws which from opposite sides press together and cool the sealing panels so that the thermoplastic layers are combined and a tight and true seal is obtained. A known machine operating in this manner is described e.g. in Swedish Pat. No. 361857.

The final processing or sealing together of the sealing fin of the top is achieved in types of machine known up to now as mentioned previously by co-operating processing jaws which in the inactive position are at a distance from one another and permit the introduction of the prepared packing top between them. The packing container is brought into the correct processing position with the help of a conveyor which is situated in relation to the processing jaws so that the top fin is placed directly adjoining the one, fixed or possibly spring-suspended processing jaw. Subsequently the other, driven processing jaw is activated so that it is moved by driving elements to the active position in contact with the sealing fin when the compression of the latter takes place. Since only the one processing jaw is directly drivable, a certain lateral displacement of the sealing fin in connection with the sealing is unavoidable because of the tolerances. This is undesirable, since it may cause a deformation of the top giving rise to defective sealing and leakage as a consequence.

It has been endeavoured to overcome these difficulties by altering the tolerances, spring suspensions or the like. However this involves a costlier design and requires more maintenance which is inappropriate in packing machines with exacting, continuous operation.

It is an object of the present invention, therefore, to provide a packing machine which has a top compression station without the aforementioned disadvantages.

It is a further object of the present invention to provide an arrangement for top compression which is of a simple design and contains few movable parts wherein play and faults can arise.

It is a further object of the present invention to provide a top compression arrangement which operates simply and accurately and which can be manufactured at low costs.

These and other objects have been achieved in accordance with the invention in an arrangement for processing of a sealing fin on a packing container. The arrangement includes two mutually co-operating processing jaws, carrier elements for the jaws and driving elements. Each processing jaw is supported by a carrier element movable in relation to the machine frame, which via spring devices is movable reciprocally in relation to the carrier element of the opposite jaw between an active position wherein the processing jaws are in contact with the sealing fin and an inactive position at a distance from the sealing fin.

The arrangement in accordance with the invention is flexible and easy to maneuver by virtue of its design and at the same time can operate with high precision. This has been achieved through the unconventional solution of using spring-suspended carrier elements for the processing jaws. The driving of both jaws increases the precision and reduces the risk of defective sealing at the same time as the small number of movable parts substantially increases operational reliability and precision.

BRIEF DESCRIPTION OF THE DRAWINGS

A preferred embodiment of the arrangement in accordance with the invention will now be described in greater detail with special reference to the enclosed schematic drawings in which like elements bear like reference numerals, and wherein.

DETAILED DESCRIPTION OF A PREFERRED EMBODIMENT

Figure 1:
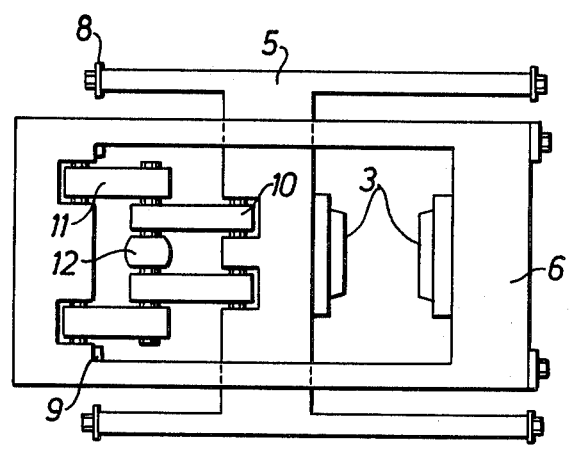
FIG. 1 is a top view of an arrangement in accordance with the invention.

The arrangement in accordance with the invention is intended to be used in a packing machine of the type which converts pre-manufactured blanks to finished, filled packing containers. A machine of this type is illustrated e.g. in the patent specifications mentioned in the introduction. The machine is supplied with packing container blanks which are provided with crease or folding lines and folded and sealed so that they obtain a substantially square cross-section. The blanks are manufactured from a packing laminate which includes a central carrier layer of paper that is covered on either side with thermoplastic layers. The thermoplastic layers are made of polyethylene and it is their purpose not only to make the packing material liquid-tight but they also act as an adhesive for the sealing. After introduction into the packing machine each packing container blank is placed on a mandrel on which different heating and forming elements fold down and shape parts of the packing material blank to a liquid-tight, plane bottom. Thereafter the packing material blanks are transferred to a conveyor which moves the blanks between different stations where they are filled with the desired contents, e.g. milk, and subjected to further processing. After filling to a certain level the parts of the packing container walls located above the liquid level are to be folded down, so that a ridgelike top with a projecting tight seal is formed. To make this possible the packing containers are moved to prefolding and activating stations where the wall panels which are to form the top of the packing container are prefolded in order to substantially give them the required top shape. The wall panels are heated, so that the edge areas which are to be made use of in the sealing are raised to a temperature which is such that the thermoplastic material present softens and can be utilized in the subsequent sealing operation.

This sealing operation takes place by making use of the arrangement in accordance with the invention. Thus the arrangement is placed near the delivery end of the packing machine and alongside the conveyor 1 (FIG. 2) which moves the packing container blanks 2 through the packing machine during the successive conversion, filling and processing. The conveyor 1 moves the packing containers intermittently between the different stations.

The arrangement in accordance with the invention includes two processing jaws 3 which are arranged at such a level above the conveyor 1 that a top fin 4 of a packing container 2 advanced on the conveyor is placed substantially centrally between the processing jaws 3. The processing jaws 3 have plane working surfaces facing towards one another which may be covered with any kind of material adapted to prevent adhesion to the top fin 4, for example tetrafluoroethylene. The processing jaws 3 are advantageously also provided with internal cooling channels within which cooling agent, e.g. water, can circulate in order to maintain the processing jaws at a suitable working temperature which promotes the cooling down and sealing of a top fin 4 clamped between the processing jaws 3.

The processing jaws 3 are each supported by carrier elements 5 and 6 respectively which extend substantially horizontally at such a distance above the packing container 2 that the container 2 can pass freely underneath the carrier elements. As illustrated in FIG. 1, one carrier element 5 is substantially H-shaped while the second carrier element 6 is of substantially rectangular shape. The legs of the H-shaped carrier 5 extend substantially parallel and a little outside the long sides of the rectangular carrier element 6, and the transverse, central part of the carrier element 5 extends underneath the carrier element 6. The carrier element 5 as well as the carrier element 6 are supported by the frame 7 of the packing machine with which they are connected by spring devices 8 and 9. The spring devices 8,9 are vertical leaf springs which at their respective ends are rigidly attached to the machine frame 7 and the different carrier elements 5,6 respectively.

The transverse part of the H-shaped carrier element 5 supports one of the two processing jaws 3 which is placed so that its working surface is facing towards the opposite processing jaw which is supported by one short side of the rectangular carrier element 6. At the opposite short side of the rectangular carrier element 6 and the side of the transverse part of the H-shaped carrier element 5 facing towards the same, linkages 10 and 11 respectively are provided which connect the carrier elements 5 and 6 respectively to a piston rod 12 extending vertically downwards. The linkages 10 and 11 are mounted in recesses in the carrier element 5 and the carrier element 6 respectively and are pivotable about horizontal axles in the carrier elements. In the upper end of the piston 12 a horizontal axle is provided which is positioned a little below the two axles arranged in the carrier elements and about which the linkages 10,11 are freely pivotable. The whole driving device, that is to say the linkages, the axles and the piston rod are connected via the piston rod to a cam arranged on the main shaft of the machine (not shown), by which the piston rod can be given a reciprocating vertical movement. The reciprocating vertical movement is converted via the linkages 10, 11 to horizontal movements acting in opposite directions which move the processing jaws 3 alternately toward, and away from, each other. The movement of the two carrier elements 5,6 in opposite directions is made possible by the mobile suspension in the machine frame 7 by spring devices 9. The geometry of the arrangement is such that all spring devices 8,9 are in a no-load condition, that is to say they extend substantially vertically upwards, when the arrangement is in the rest position shown in the figures with the processing jaws 3 in open position.

Figure 2:
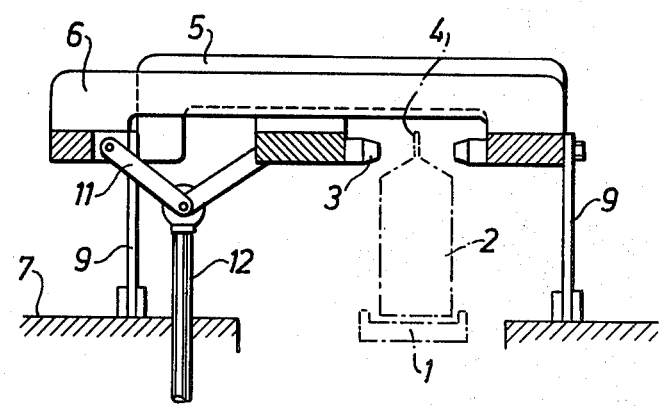
FIG. 2 is a side sectional view through the arrangement in accordance with the invention, the position of a processed packing container being indicated by dash-dotted lines.

When the arrangement is in operation a packing container 2 is moved by the conveyor 1 from the folding and adhesive activation stations to the position shown in FIG. 2 where the movement of the conveyor stops when the packing container 2 is in the centered position between the two open processing jaws 3. In this position the arrangement is activated with the help of the driving device in that the piston rod 12 is moved vertically upwards so that the ends of the linkages located at the piston rod are lifted and the opposite ends, mounted pivotably in the carrier elements 5,6, are moved in directions away from one another. This means that the carrier element 5 will be moved towards the right in FIG. 2 at the same time as the carrier element 6 is moved towards the left. Since the piston rod 12 is guided sideways by the machine frame, the movements of the carrier elements will be symmetrical which means that the processing jaws 3 are moved towards each other and meet in a precisely centered position straight over the longitudinal center line of the conveyor 1. During this movement the spring device 8,9 will be bent, which means that the processing jaws do not move completely horizontally and straight towards each other but instead describe a pivoting movement downwards. The downward pivoting movement partially coincides with the pivoting movement which the wall panels forming the top fin 4 describe when they are guided towards each other and in so doing pivot about a pivoting axis situated further down on the packing container. In this manner the sliding between the working surfaces of the processing jaws 3 and the wall panels of the top fin 4 is reduced which is an advantage for the operation of the arrangement and brings about the quality of the seal. The forces which in the operation of the arrangements act upon the spring devices can be minimized by placing the pivot points in the carrier elements 5,6 and the processing jaws in a common horizontal plane. In this way torsion stresses are prevented which during prolonged operation might bring about fatigue failure of the spring device.

It is evident from the above that the spring devices 8,9 together provide a parallelogram-like suspension for the processing jaws 3 or the carrier elements 5,6 so that on their being maneuvred by the driving device 10,11,12 they are displaced in sideways direction without losing their horizontal orientation. The absence of conventional linkages for the supporting of the carrier elements means that it has been possible to eliminate a customary source of error at the same time as the need for maintenance and lubrication has been appreciably reduced. Because of their rigid connection to the carrier elements as well as to the machine frame, the leaf springs serving as spring devices 8,9 are not subjected to such an amount of wear that any form of play or inaccuracy arises, even in prolonged operation. The absence of movable parts also reflects in less need for lubrication which is an appreciable advantage in machines for the handling of foodstuffs.

The sideways guiding of the piston rod 12 in the machine frame together with the flexible suspension of the carrier elements in the spring devices means that the exact meeting position of the processing jaws 3 straight above the centre line of the conveyor can be maintained without difficulty and is not affected by wearing out or other changes during the life of the arrangement.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. An arrangement for processing a sealing fin on a packing container, comprising:
    a machine frame;
    two carrier elements movably secured to said frame with each of the carrier elements supported by four spring devices; said spring devices defining a parallelogram suspension for the carrier elements;
    driving elements pivotably connected to said carrier elements for reciprocally moving each carrier element in an opposite direction relative to the other carrier element; and
    a processing jaw supported by each carrier element on opposite sides of said sealing fin, said processing jaws being moved by said carrier elements between an active position wherein the processing jaws contact the sealing fin and an inactive position wherein the processing jaws are spaced from the sealing fin.

2. The arrangement in accordance with claim 1, wherein the spring devices are leaf springs which extend substantially vertically between the frame and each carrier element.

3. The arrangement in accordance with claim 1, wherein the spring devices are rigidly connected to the frame as well as to the carrier elements.

4. The arrangement in accordance with claim 1, wherein a point of attachment of the spring devices in the machine frame is vertically spaced from the level of the processing jaws.

5. The arrangement in accordance with claim 1, wherein the driving elements comprise a linkage pivotably connected to each carrier element at pivot points, said linkage being adapted to drive the carrier elements from a common driving source in oppositely directed reciprocating movements.

6. The arrangement in accordance with claim 5, wherein the pivot points in the carrier elements and the processing jaws are located in a common plane.

7. The arrangement in accordance with claim 5, wherein the common driving source comprises a piston rod which is guided sideways by the machine frame, said piston rod having one end connected to the linkages.

8. The arrangement in accordance with claim 7, wherein the sideways guidance of the piston rod in the machine frame is such that the movements of the processing jaws are generally symmetrical in relation to the position of the processed packing container.

9. An arrangement for compressing and sealing of a sealing fin on a packing container, said arrangement comprising:
    a machine frame through which a packing container is conveyed;
    two generally horizontal carrier elements movably supported above said frame by substantially vertically extending spring devices, each carrier element being supported by four spring devices serving as a parallelogram suspension for the carrier elements;
    a compression and sealing jaw supported by each carrier element in said frame on opposite sides of the sealing fin of the container;
    a linkage pivotably connected to each carrier element; and
    a vertically reciprocating piston rod pivotably connected to the linkage of each carrier element, vertical reciprocating movement of said piston rod being transformed by said linkage into horizontal oppositely-directed reciprocating movements of said carrier elements in order to place the jaws into contact with the sealing fin and withdraw the jaws from the sealing fin.

10. The arrangement in accordance with claim 9, wherein the sealing jaws are provided with internal channels in which a cooling agent circulates to maintain said jaws at a suitable working temperature.

* * * * *